(12) United States Patent
Peng (10) Patent No.: US 11,089,272 B1
(45) Date of Patent: Aug. 10, 2021

(54) SYSTEMS AND METHODS FOR HIGH-CONTRAST SPATIAL LIGHT MODULATION

(71) Applicant: PhotonEdge Inc., Pleasanton, CA (US)

(72) Inventor: Song Peng, Pleasanton, CA (US)

(73) Assignee: PhotonEdge Inc., Pleasanton, CA (US)

( * ) Notice: Subject to any disclaimer, the term of this patent is extended or adjusted under 35 U.S.C. 154(b) by 0 days.

(21) Appl. No.: 16/708,128

(22) Filed: Dec. 9, 2019

Related U.S. Application Data (60) Provisional application No. 62/778,826, filed on Dec. 12, 2018.

(51) Int. Cl.
*H04N 9/31* (2006.01)

(52) U.S. Cl.
CPC ......... *H04N 9/3102* (2013.01); *H04N 9/3141* (2013.01)

(58) Field of Classification Search
CPC .. G03B 21/006; G03B 21/008; G03B 21/028; G03B 21/142; G03B 21/145; G03B 21/147; G03B 21/208; H04N 9/3102; H04N 9/3105; H04N 9/3126; H04N 9/3141; H04N 9/3152; H04N 9/3158; H04N 9/3161; H04N 9/3164; H04N 9/3185

See application file for complete search history.

(56) References Cited

U.S. PATENT DOCUMENTS

| | | | | |
|---|---|---|---|---|
| 7,551,341 B1* | 6/2009 | Ward | ............... | G03B 21/26 359/259 |
| 2004/0263989 A1* | 12/2004 | Cobb | ............... | H04N 9/315 359/634 |
| 2008/0088800 A1* | 4/2008 | Bellis | ............... | H04N 9/3147 353/30 |
| 2009/0103053 A1* | 4/2009 | Ichikawa | ............... | G03B 21/008 353/33 |
| 2013/0050803 A1* | 2/2013 | Stowe | ............... | G02B 13/08 359/292 |
| 2013/0300999 A1* | 11/2013 | DeJong | ............... | G02B 27/017 351/158 |
| 2015/0124175 A1* | 5/2015 | Perkins | ............... | G03B 21/208 348/759 |

* cited by examiner

*Primary Examiner* — Sultan Chowdhury
(74) *Attorney, Agent, or Firm* — Peter Su; Radlo & Su (57) ABSTRACT

Embodiments of the present disclosure are directed to optical instruments and methods for enhancing high-contrast spatial light modulation with cascaded spatial light modulators where a first spatial light modulator displays a first spatial pattern that subsequent cascaded one or more spatial light modulators would calibrate and align with the first spatial pattern, thereby increasing the device contrast ratio of the output pattern displayed by the cascaded spatial light modulators. A relay optics is positioned somewhere between two spatial light modulators for imaging a spatial pattern from one spatial light modulator to another spatial light modulator. In addition, a light source generating an illumination to the first spatial light modulator. A projection lens receives the output pattern from an output of the cascaded spatial light modulators and imaged the output pattern to a required distance at a required magnification by a projection lens.

17 Claims, 5 Drawing Sheets

SYSTEMS AND METHODS FOR HIGH-CONTRAST SPATIAL LIGHT MODULATION

CROSS REFERENCE TO RELATED APPLICATIONS

The present application claims priority to and the benefit of U.S. Provisional Application Ser. No. 62/778,826 entitled "High Contrast Spatial Light Modulation," filed on 12 Dec. 2018, the disclosure of which is incorporated herein by reference in its entirety.

BACKGROUND

Technical Field

The present disclosure relates generally to fields of optical imaging, and more particularly to contrast ratios in spatial light modulators (SLMs) for imaging projection.

Background Art

A spatial light modulator has a contrast parameter that is defined as the intensity ratio between ON and OFF pixels, i.e., the brightness of the ON pixel(s) divided by the brightness of the OFF pixels. Typical contrast of the current state-of-the-art SLMs such as digital micromirror devices (DMD) and liquid crystal displays (LCD) have a ratio of around 1000:1. When one pixel is turned ON, this pixel area is bright. When all remaining pixels in the grid are turned OFF, the all remaining pixels are dark, but in actuality the all remaining pixels are not completely dark. For most applications, it is preferably to have the intensity of dark to be very dark and the intensity of brightness to be very bright. Conventional solutions in a conference room or a cinema has a contrast ratio of 1000:1, where the intensity of the brightness is about 1,000 times relative to the dark area. This contrast intensity ratio may be sufficiently adequate for most applications such as information display and semiconductor lithography. However, other applications may require much higher contrast ratios.

Accordingly, it is desirable to design an optical system with a high-contrast spatial light modulation.

SUMMARY OF THE DISCLOSURE

Embodiments of the present disclosure are directed to optical instruments and methods for enhancing high-contrast spatial light modulation with cascaded spatial light modulators where a first spatial light modulator displays a first spatial pattern that subsequent one or more cascaded spatial light modulators would calibrate and align with the first spatial pattern, thereby increasing the device contrast ratio of the output pattern displayed by the one or more cascaded spatial light modulators. A relay optics is positioned somewhere between two spatial light modulators for imaging a spatial pattern from one spatial light modulator to the next spatial light modulator. In addition, a light source generates an illumination to the first spatial light modulator. A projection lens receives the output pattern from an output of the cascaded spatial light modulators and imaged the output pattern to a required distance at a required magnification.

In one illustration, if the cascaded spatial light modulators include two spatial light modulators, the device contrast ratio of the two spatial light modulators would be computed and represented as follows: $C = C_1^2$, wherein the system contrast C is produced such that a second spatial pattern in the second spatial light modulator is substantially the same or the same as a first spatial pattern in the first spatial light modulator, and wherein the symbol. $C_1$ denotes a device contrast ratio of the first spatial light modulator, or a device contrast ratio of the second spatial light modulator. The first spatial pattern comprises an active area A and a background area B, the first spatial pattern being displayed by both the first spatial light modulator and the second spatial light modulator, such that an area contrast Ca is represented as follows:

$$C_a = C\, A/B = C_1^2 A/B$$

In some embodiments, the light source may comprise an LED, a laser, or any type of light generating device. In some embodiments, the relay optics may comprise either a reflective optics or a refractive optics, or a combination of both. Other embodiments for incorporating additional functions or components for increasing the device contrast ratio can be practiced without departing from the spirits of the present invention.

Broadly stated, a system, comprises a light source for generating an illumination; a first spatial light modulator for receiving the illumination from the light source and displaying a first spatial pattern; a relay optics; and a second spatial light modulator for displaying a second spatial pattern, the relay optics for imaging the first spatial pattern from the first spatial light modulator to the second spatial light modulator, the second spatial modulator being calibrated to align the second spatial pattern to the first spatial pattern, the second spatial pattern substantially the same or the same as the first spatial pattern.

The structures and methods of the present disclosure are disclosed in detail in the description below. This summary does not purport to define the disclosure. The disclosure is defined by the claims. These and other embodiments, features, aspects, and advantages of the disclosure will become better understood with regard to the following description, appended claims, and accompanying drawings.

Additional features and advantages of embodiments will be set forth in the description, which follows, and in part will be apparent from the description. The objectives and other advantages of the invention will be realized and attained by the structure particularly pointed out in the example embodiments in the written description and claims hereof as well as the appended drawings. It is to be understood that both the foregoing general description and the following detailed description are illustrative and explanatory and are intended to provide further explanation of the invention as claimed.

BRIEF DESCRIPTION OF THE DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings wherein like reference numerals represent like elements and in which:

FIGS. 1A-1E3 are block diagrams illustrating an M×N array with an active area and a background area in accordance with the present invention.

DETAILED DESCRIPTION

A description of structural embodiments and methods of the present invention is provided with reference to FIGS. 1-4. It is to be understood that there is no intention to limit the invention to the specifically disclosed embodiments but that the invention may be operated using other features, elements, methods, and embodiments that are known to those of skill in the art. Like elements in various embodiments are commonly referred to with like reference numerals.

Different arrangements described herein are provided by way of example only, and other arrangements and elements can be added or used instead and some elements may be omitted altogether. Also, those skilled in the art will appreciate that many of the elements described herein are functional entities that may be implemented as discrete components or in conjunction with other components, in any suitable combination and location, and various functions could be carried out by optics, optoelectronics, software, firmware and/or hardware.

Figure 1A:
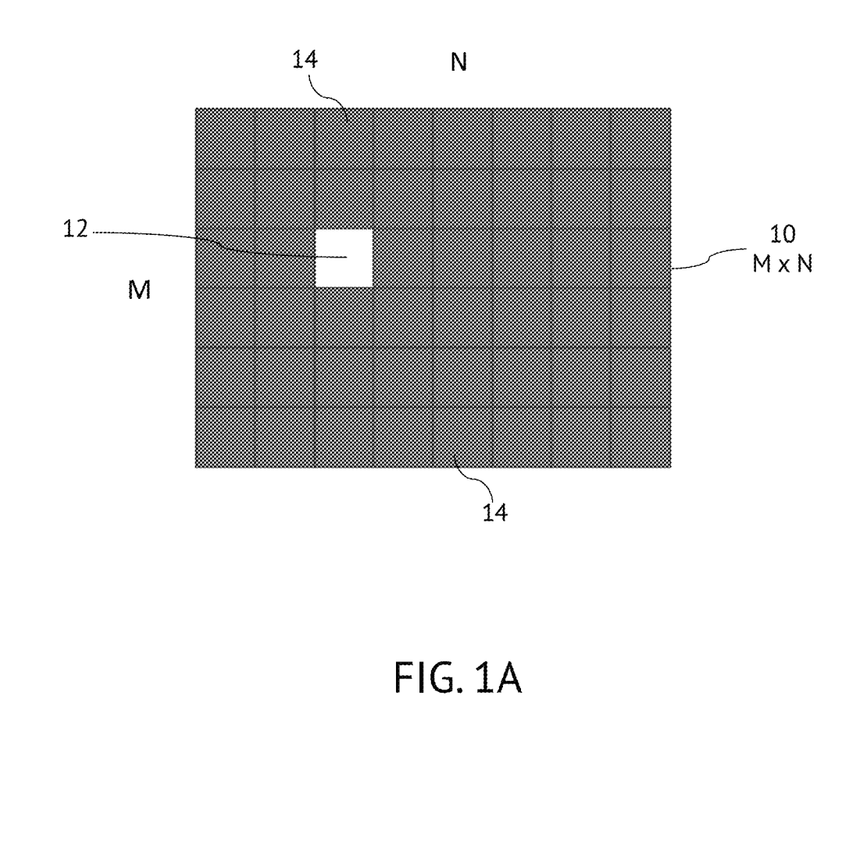

FIG. 1A is a block diagram illustrating of a spatial light modulator 24 that displays an M×N array 10 with an active area 12 and a background area 14. One example that requires much higher contrast ratios is optogenetic stimulation in biological tissues. A typical experiment in optogenetic stimulation involves stimulating each square in an M×N grid while monitoring electrophysiology response from a fixed neuron. Assuming the square that is turned ON provides an optical dose of 1, then each OFF square generates a dose of $\frac{1}{1000}$ as the contrast ratio is 1000:1. Because there are M×N−1 OFF squares in the grid, the total background dose is determined to be (M×N−1)/1000. The effective contrast between the single ON square and all the OFF square becomes 1:(M×N−1)/1000. In an example which M=N=32, the effective contrast is 1:1023/1000 or 1:1.023, resulting in a significantly lower contrast than the traditional contrast definition with value of 1000:1.

Generalizing the above example, a new contrast ratio referenced as an area contrast $C_a$ is shown below:

$$C_a = C\frac{A}{B}$$

where the symbol C denotes the traditional contrast (device contrast or local contrast), the symbol. A denotes the active area (where SLM pixels are turned ON) and the symbol. B denotes the background area (where SLM pixels are turned OFF). The area contrast ratio diminishes quickly as the background area increases. Therefore, covering a large area and/or using a smaller active grid cell require a much higher device contrast ratio.

Figure 1B:
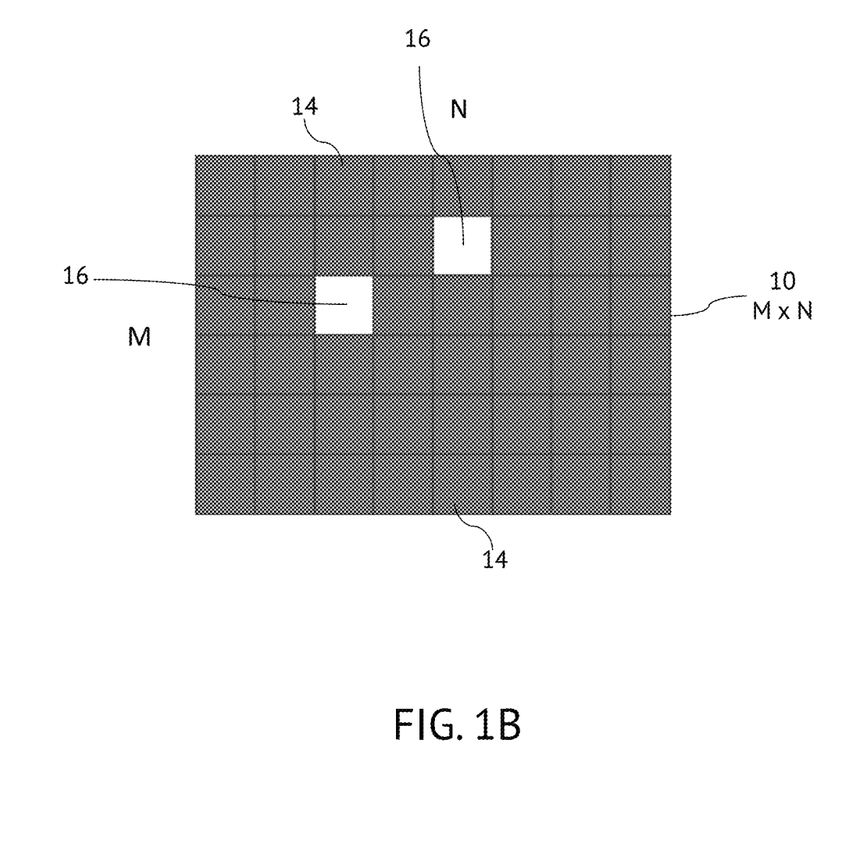

FIG. 1B is a block diagram illustrating of a spatial light modulator 12 that displays an M×N array 10 with an active area 16 and the background area 14. The active area 16 in the M×N array 10 comprises multiple geometric shapes (e.g., squares, rectangles, circles, etc.). A spatial light modulator is able to display a spatial pattern with multiple spots, which provides an advantage over a laser solution which shines on just one spot at a time. Even though a laser scanner can provide high area contrast, SLM systems are able to generate simultaneous multi-spot patterns.

System Overview

Figure 2:
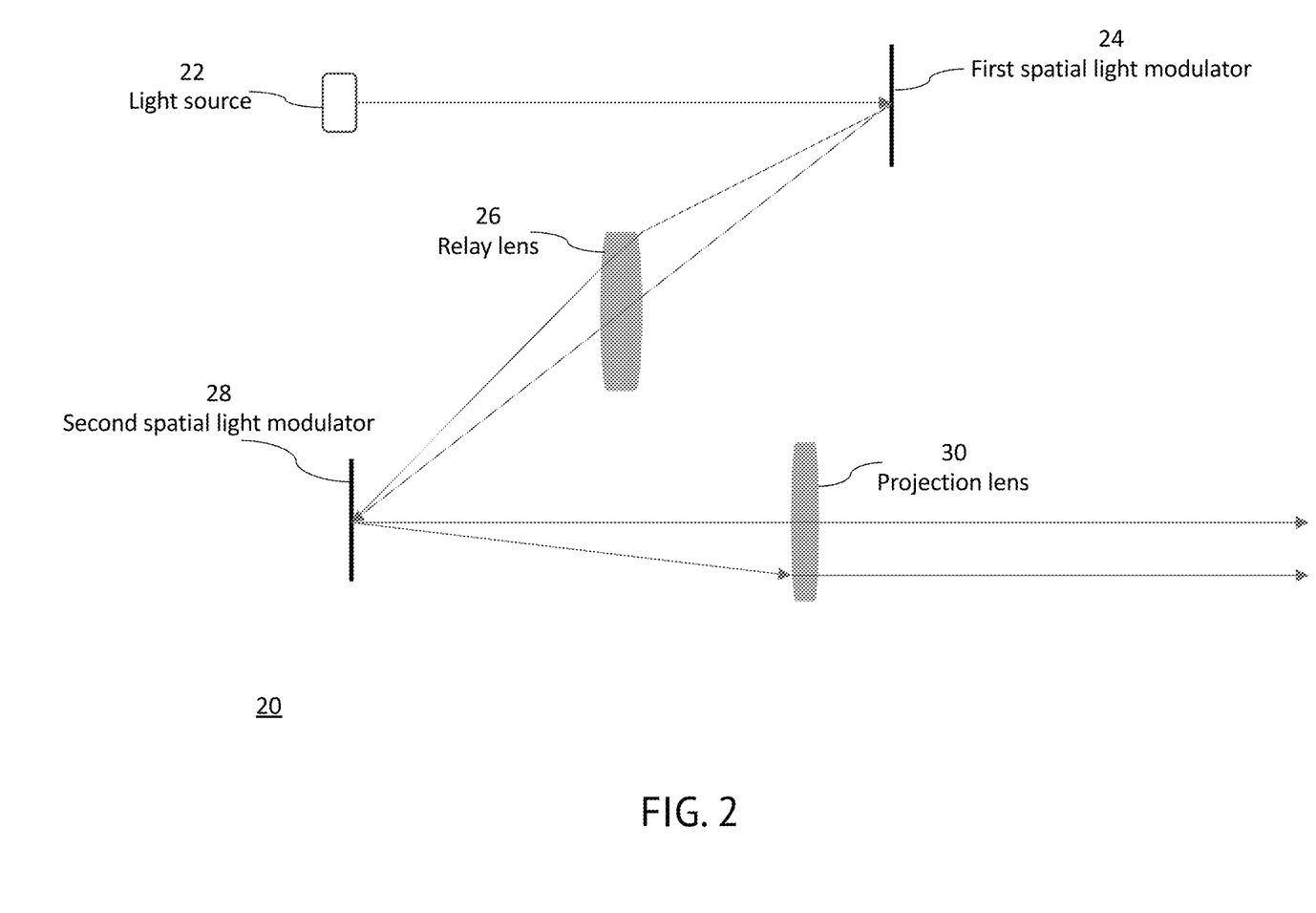
FIG. 2 is a system diagram illustrating one embodiment structure of a spatial light modulation system having two cascaded spatial light modulators in accordance with the present invention.

FIG. 2 is a spatial light modulation system diagram 20 illustrating one embodiment structure of a spatial light modulation system having two cascaded spatial light modulators. The first spatial light modulator 24 (SLM) is illuminated by a light source 22. The modulated light from the first spatial light modulator 24 is imaged onto a second spatial light modulator 28 by a relay lens 26. To phrase it another way, the first and second spatial light modulators 24, 28 are in optical conjugate positions. The modulated light from the second spatial light modulator 28 is the output of the spatial light modulation system 20. As an application example, the second spatial light modulator 28 is imaged to a required distance at a required magnification by a projection lens 30.

The term "cascaded spatial light modulators" refer to (1) two spatial light modulators, (2) a plurality of spatial light modulators, (3) multiple spatial light modulators, (4) two or more spatial light modulators, (5) three spatial light modulators, (6) three or more spatial light modulators, or (7) other combination variations.

Figure 3:
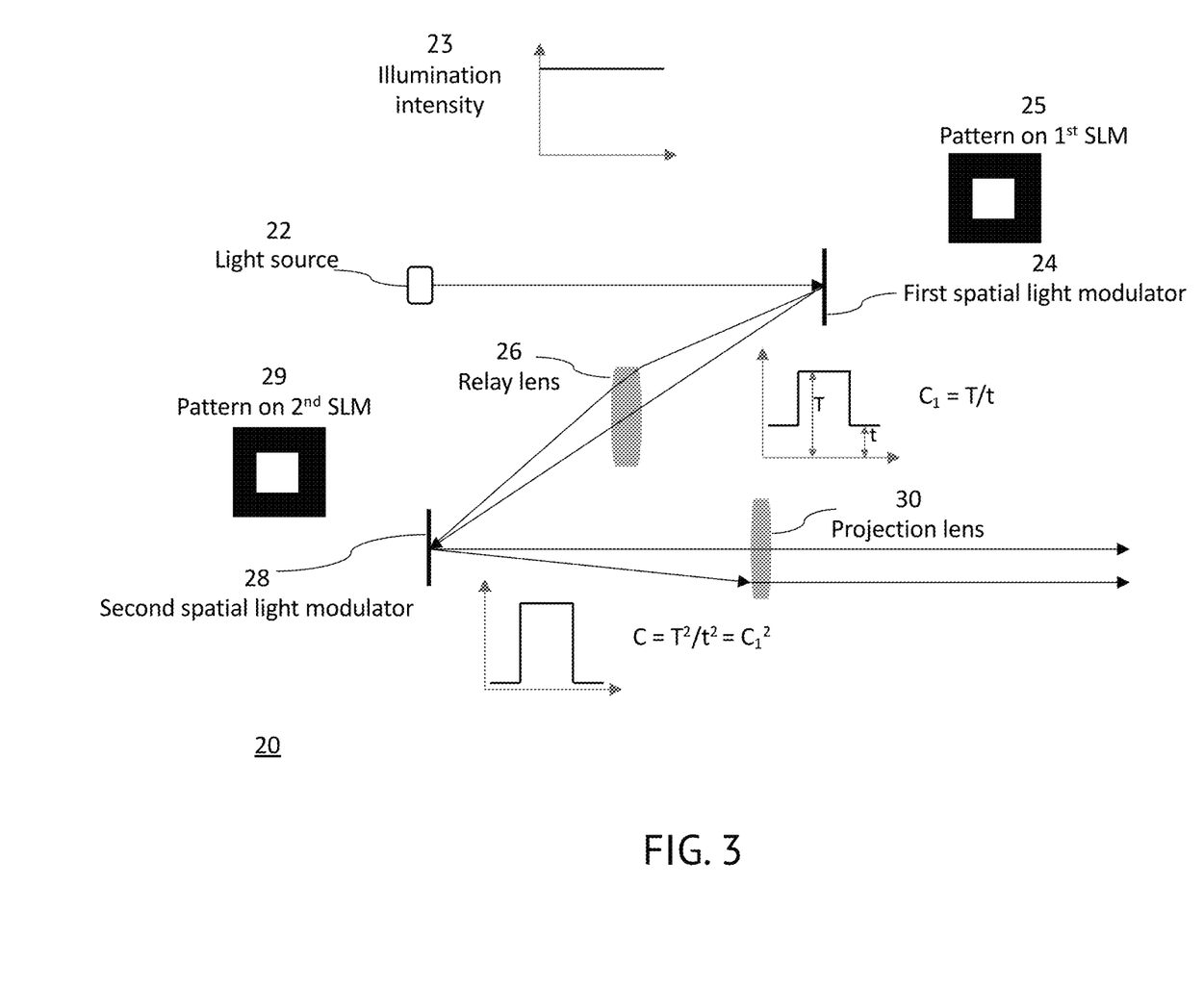
FIG. 3 is a system diagram illustrating the one embodiment structure of the spatial light modulation system with an enhanced contrast ratio resulting from cascaded multiple spatial light modulators in accordance with the present invention.

FIG. 3 is a system diagram illustrating the one embodiment of spatial light modulation system 20 with an enhanced contrast ratio resulting from the cascaded multiple spatial light modulators 24, 28. The light source 22 generates a uniform illumination 23 to the first spatial light modulator 24. The first spatial light modulator 24 modulates the incoming uniform illumination 23 and displays a first spatial pattern 25. The first spatial pattern 25 can be formed by one of a variety of geometric shapes (e.g., squares, rectangles, circles, etc.), represented by an M×N array, where the symbol. M denotes the y-axis and the symbol. N denotes the x-axis. In one example, the array of geometric shapes M×N has a first area which one or more pixels are turned ON and a second area which one or more pixels are turned OFF. In the first area which one or more pixels are turned ON, the reflection efficiency is represented by the symbol. T. In the second area where one or more pixels are turned OFF, the reflection efficiency is represented by the symbol t. Thus, the first spatial light modulator 24 has a device contrast $C_1$ represented mathematically by the equation, $C_1 = T/t$.

The relay lens 26 images the first spatial pattern 25 onto the second spatial light modulator 28. The second spatial light modulator 28 calibrates and aligns a second spatial pattern 29 relative to the first spatial pattern 25. To phrase it another way, the second spatial pattern 29 on the second spatial light modulator 28 is set so that the second spatial light modulator 28 duplicates the second spatial pattern 29 substantially the same or as the same as the first spatial pattern 25 generated from the first spatial light modulator 24. Specifically, a pixel on the second spatial light modulator 28 is turned ON if the pixel is illuminated by an ON pixel of the first spatial light modulator 24. The remaining pixels on second spatial light modulator 28 are turned OFF.

The second spatial light modulator 28 displays an output pattern that includes an area where both the first and second spatial light modulators 24, 28 are turned ON have a reflection represented mathematically by the symbol. F. In the area where both first and second spatial light modulators 24, 28 are turned OFF have a reflection represented mathematically by the symbol $t^2$. In this example and for simplicity of illustration, the second spatial light modulator 28 is assumed to have the same device contrast as the first spatial light modulator 24. The second spatial light modulator 28 generates an output pattern with an enhanced device contrast ratio C represented mathematically by the symbol. $C=T^2/t^2=C_1^2$. As an example, if the device contrast ratio for each of the spatial light modulators 24, 28 is 1000:1, then the resulting system device contrast would be calculated to be 1,000,000:1. The projection lens 30 receives the output pattern from the second spatial light modulator 28 and projects the output pattern.

In other embodiments, the two cascaded spatial light modulators 24, 28 illustrated in the spatial light modulation system 20 as illustrated in FIGS. 1 and 2 can be expanded to one or more additional spatial light modulators to produce an even greater contrast ratio.

Distortion or other aberrations may be introduced when the relay lens 26 images the first spatial light modulator 24 onto the second spatial light modulator 28. Careful calibrations may be necessary to map the pixels from the first spatial light modulator 24 to one or more subsequent cascaded spatial light modulators.

In further embodiments, the second spatial light modulator 28 may be used as the master spatial light modulator where the desired output pattern is displayed. The bright area (where the pixels are turned ON) on the first spatial light modulator 24 may be set slightly bigger than that on the second spatial light modulator 28 to ensure that all the ON pixels of the second spatial light modulator 28 are properly illuminated.

Figure 4:
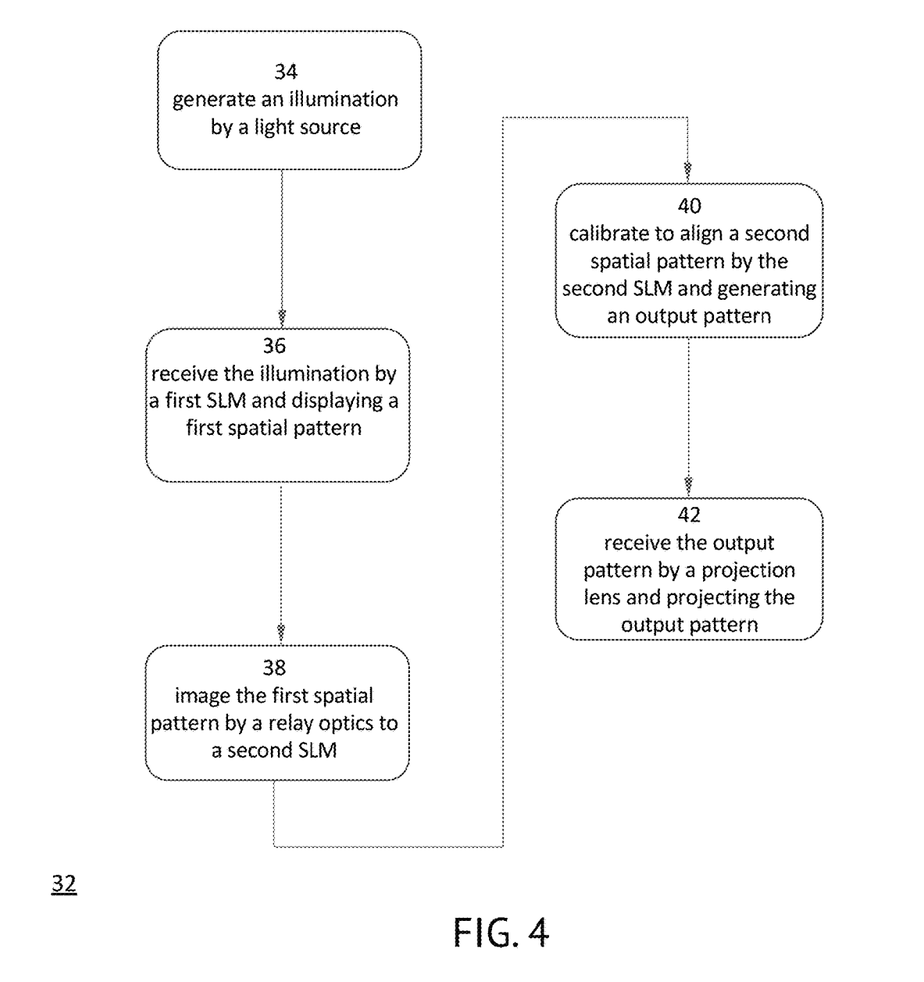
FIG. 4 is a flow diagram illustrating an enhanced contrast process of the spatial light modulation system with multiple spatial light modulators in accordance with the present invention.

FIG. 4 is a flow diagram illustrating an enhanced contrast process 32 of the spatial light modulation system 20 with multiple spatial light modulators 24, 28. At step 34, the light source 22 generates a uniform illumination 23 to the first spatial light modulator 24. At step 36, the first spatial light modulator 24 modulates the incoming uniform illumination 23 and displays a first spatial pattern 25. The first spatial pattern 25 can be formed by one of a variety of geometric shapes (e.g., squares, rectangles, circles, etc.), represented by an M×N array, where the symbol. M denotes the y-axis and the symbol. N denotes the x-axis. In one example, the array of geometric shapes M×N has a first area which one or more pixels are turned ON and a second area which one or more pixels are turned OFF. In the first area which one or more pixels are turned ON, the reflection efficiency is represented by the symbol. T. In the second area where one or more pixels are turned OFF, the reflection efficiency is represented by the symbol t. Thus, the first spatial light modulator 24 has a device contrast $C_1$ represented mathematically by the equation, $C_1=T/t$.

At step 38, the relay lens 26 images the first spatial pattern 25 onto the second spatial light modulator 28. The second spatial light modulator 28 calibrates and aligns a second spatial pattern 29 relative to the first spatial pattern 25. To phrase it another way, the second spatial pattern 29 on the second spatial light modulator 28 is set so that the second spatial light modulator 28 duplicates the second spatial pattern 29 substantially the same or as the same as the first spatial pattern 25 generated from the first spatial light modulator 24. Specifically, a pixel on the second spatial light modulator 28 is turned ON if the pixel is illuminated by an ON pixel of the first spatial light modulator 24. The remaining pixels on second spatial light modulator 2 are turned OFF.

At step 40, the second spatial light modulator 28 displays an output pattern that includes an area where both the first and second spatial light modulators 24, 28 are turned ON have a reflection represented mathematically by the symbol. F. In the area where both first and second spatial light modulators 24, 28 are turned OFF have a reflection represented mathematically by the symbol $t^2$. In this example and for simplicity of illustration, the second spatial light modulator 28 is assumed to have the same device contrast as the first spatial light modulator 24. The second spatial light modulator 28 generates an output pattern, resulting in an enhanced device contrast ratio C represented mathematically by the symbol. $C=T^2/t^2=C_1^2$. As an example, if the device contrast ratio for each of the spatial light modulator 24, 28 is 1000:1, then the resulting system device contrast would be calculated to be 1,000,000:1. At step 42, the projection lens 30 receives the output pattern from the second spatial light modulator 28 and imaged the output pattern to a required distance at a required magnification by a projection lens.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in view of the above disclosure. For example, the M×N grid pattern is just one spatial pattern for illustrating the concept of area contrast. Any other types of spatial patterns or modified spatial patterns can be practiced without departing from the present disclosure.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B are satisfied by any one of the following: A is true (or present) and B is fake (or not present), A is fake (or not present) and B is true (or present), and both A and B are true (or present).

The terms "a" or "an," as used herein, are defined as one or more than one. The term "plurality," as used herein, is defined as two or more than two. The term "another," as used herein, is defined as at least a second or more.

The invention can be implemented in numerous ways, including as a process, an apparatus, and a system. In this specification, these implementations, or any other form that the invention may take, may be referred to as techniques. In general, the order of the connections of disclosed apparatus may be altered within the scope of the invention.

The present invention has been described in particular detail with respect to some possible embodiments. Those skilled in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component. An ordinary artisan should require no additional explanation in developing the methods and systems described herein but may nevertheless find some possibly helpful guidance in the preparation of these methods and systems by examining standard reference works in the relevant art.

These and other changes can be made to the invention in light of the above detailed description. In general, in the following claims, the terms used should not be construed to limit the invention to the specific embodiments disclosed in the specification and the claims, but should be construed to include all methods and systems that operate under the claims set forth herein below. Accordingly, the invention is not limited by the invention, but instead its scope is to be determined entirely by the following claims.

What is claimed and desired to be secured by Letters Patent of the United States is:

1. A system, comprising:
    a light source for generating an illumination;
    a first spatial light modulator including a first plurality of pixels for receiving the illumination from the light source and displaying a first spatial pattern;
    a relay optics; and
    a second spatial light modulator including a second plurality of pixels for displaying a second spatial pattern, the relay optics for imaging the first spatial pattern from the first spatial light modulator to the second spatial light modulator, the second spatial modulator being calibrated to align the second spatial pattern to the first spatial pattern, the second spatial pattern substantially the same or the same as the first spatial pattern;
    wherein the second spatial pattern substantially the same or the same as the first spatial pattern produces a system contrast C, as represented by the following equation:

$$C=C_1^2$$

the symbol C1 denoting a device contrast ratio of the first spatial light modulator, or a device contrast ratio of the second spatial light modulator.

2. The system of claim 1, further comprising a projection lens for receiving the output pattern from the second spatial light modulator and imaged the output pattern to a required distance at a required magnification by the projection lens.

3. The system of claim 1, wherein the relay optics comprises a reflective optics or a refractive optics, or a combination of both.

4. The system of claim 1, wherein the light source comprises an LED, a laser, or any type of light generating device.

5. A system, comprising:
    a light source for generating an illumination;
    two or more N cascaded spatial light modulators, each spatial light modulator displaying a spatial pattern, a first spatial light modulator for receiving the illumination from the light source;
    a relay optics for imaging a spatial pattern from a preceding spatial light modulator to the next spatial light modulator;
    wherein each of the one or more cascaded spatial light modulators is calibrated thereby all of the spatial patterns are aligned with each other, and wherein all of the spatial patterns are substantially the same or the same;
    wherein the second spatial pattern substantially the same or the same as the first spatial pattern produces a system contrast $C_a$, as represented by the following equation:

$$C_a=C_1^N$$

the symbol C1 denoting a device contrast ratio of the first spatial light modulator, or a device contrast ratio of the second spatial light modulators in the two or more N cascaded spatial light modulators.

6. The system of claim 5, further comprising a projection lens for receiving the output pattern from the second spatial light modulator and imaged the output pattern to a required distance at a required magnification by the projection lens.

7. The system of claim 5, wherein the relay optics comprises a reflective optics or a refractive optics, or a combination of both.

8. The system of claim 5, wherein the light source comprises an LED, a laser, or any type of light generating device.

9. A system, comprising:
    a light source for generating an illumination;
    a first spatial light modulator including a first plurality of pixels for receiving the illumination from the light source and generating a spatial pattern;
    a relay optics; and
    a second spatial light modulator including a second plurality of pixels, the relay optics for imaging the spatial pattern from the first spatial light modulator to the second spatial light modulator, the second spatial light modulator generating an output pattern;
    wherein the second spatial pattern substantially the same or the same as the first spatial pattern produces a system contrast C, as represented by the following equation:

$$C=C_1^2$$

the symbol C1 denoting a device contrast ratio of the first spatial light modulator, or a device contrast ratio of the second spatial light modulator.

10. The system of claim 9, further comprising a projection lens for receiving the output pattern from the second spatial light modulator and imaged the output pattern to a required distance at a required magnification by the projection lens.

11. The system of claim 9, wherein the second spatial light modulator displaying a second spatial pattern, the second spatial modulator being calibrated to align the second spatial pattern to the first spatial pattern, the second spatial pattern substantially the same or the same as the first spatial pattern.

12. The system of claim 9, wherein the relay optics comprises a reflective optics or a refractive optics, or a combination of both.

13. The system of claim 9, wherein the light source comprises an LED, a laser, or any type of light generating device.

14. A method for enhancing a high-contrast spatial light modulation, comprising:
generating an illumination by a light source;
receiving the illumination from the light source by a first spatial light modulator and displaying a first spatial pattern, the first spatial light modulator including a first plurality of pixels;
imaging the first spatial pattern, by a relay optics, from the first spatial light modulator to the second spatial light modulator, the second spatial light modulator including a second plurality of pixels; and
calibrating and aligning, by the second spatial modulator, the second spatial pattern to the first spatial pattern so that the second spatial pattern is substantially the same or the same as the first spatial pattern;
wherein the second spatial pattern substantially the same or the same as the first spatial pattern produces a system contrast C, as represented by the following equation:

$$C=C_1^2$$

the symbol $C_1$ denoting a device contrast ratio of the first spatial light modulator, or a device contrast ratio of the second spatial light modulator.

15. A system, comprising:
a light source for generating an illumination;
a first spatial light modulator including a first plurality of pixels for receiving the illumination from the light source and displaying a first spatial pattern;
a relay optics; and
a second spatial light modulator including a second plurality of pixels for displaying a second spatial pattern, the relay optics for imaging the first spatial pattern from the first spatial light modulator to the second spatial light modulator, the second spatial modulator being calibrated to align the second spatial pattern to the first spatial pattern, the second spatial pattern substantially the same or the same as the first spatial pattern;
wherein the second spatial pattern substantially the same or the same as the first spatial pattern produces a system contrast C, as represented by the following equation:

$$C=C_1^2$$

wherein the symbol $C_1$ denotes a device contrast ratio of the first spatial light modulator, or a device contrast ratio of the second spatial light modulator, the first spatial pattern comprising an active area A and a background area B, the first spatial pattern being displayed by both the first spatial light modulator and the second spatial light modulator, such that an area contrast $C_a$ is represented as follows:

$$C_a=C\ A/B=C_1^2 A/B.$$

16. A system, comprising:
a light source for generating an illumination;
two or more N cascaded spatial light modulators, each spatial light modulator displaying a spatial pattern, a first spatial light modulator for receiving the illumination from the light source;
a relay optics for imaging a spatial pattern from a preceding spatial light modulator to the next spatial light modulator;
wherein each of the one or more cascaded spatial light modulators is calibrated thereby all of the spatial patterns are aligned with each other, and wherein all of the spatial patterns are substantially the same or the same; and
wherein the second spatial pattern is substantially the same or the same as the first spatial pattern produces a system contrast $C_a$, as represented by the following equation:

$$C_a=C_1^N$$

the symbol $C_1$ denoting a device contrast ratio of the first spatial light modulator, or a device contrast ratio of other spatial light modulators in the two or more N cascaded spatial light modulators, the first spatial pattern comprising an active area A and a background area B, the first spatial pattern being displayed by the first spatial light modulator and other spatial light modulators in the two or more N cascaded spatial light modulators, such that an area contrast Ca is represented as follows:

$$C_a=C\ A/B=A/B.$$

17. A system, comprising:
a light source for generating an illumination;
a first spatial light modulator including a first plurality of pixels for receiving the illumination from the light source and generating a spatial pattern;
a relay optics; and
a second spatial light modulator including a second plurality of pixels, the relay optics for imaging the spatial pattern from the first spatial light modulator to the second spatial light modulator, the second spatial light modulator generating an output pattern;
wherein the second spatial pattern substantially the same or the same as the first spatial pattern produces a system contrast C, as represented by the following equation:

$$C=C_1^2$$

the symbol $C_1$ denoting a device contrast ratio of the first spatial light modulator, or a device contrast ratio of the second spatial light modulator.

* * * * *